US012686260B2

(12) United States Patent
Park et al.

(10) Patent No.:  US 12,686,260 B2
(45) Date of Patent:      Jul. 21, 2026

(54) POWER TRANSMISSION DEVICE

(71) Applicants: C-STONE TECHNOLOGIES CO., LTD., Suwon-si (KR); Dong-Hoon Park, Seongnam-si (KR)

(72) Inventors: Dong-Hoon Park, Seongnam-si (KR); June Ki Min, Suwon-si (KR)

(73) Assignees: C-STONE TECHNOLOGIES CO., LTD., Suwon-si (KR); Dong-Hoon Park, Seongnam-si (KR)

( * ) Notice: Subject to any disclaimer, the term of this patent is extended or adjusted under 35 U.S.C. 154(b) by 266 days.

(21) Appl. No.: 18/580,215

(22) PCT Filed: Jul. 5, 2022

(86) PCT No.: PCT/KR2022/009679
§ 371 (c)(1),
(2) Date: Jan. 18, 2024

(87) PCT Pub. No.: WO2023/008762
PCT Pub. Date: Feb. 2, 2023

(65) Prior Publication Data
US 2024/0343107 A1      Oct. 17, 2024

(30) Foreign Application Priority Data
Jul. 28, 2021      (KR) ........................ 10-2021-0099294

(51) Int. Cl.
B60K 7/00                (2006.01)
(52) U.S. Cl.
CPC .... B60K 7/0007 (2013.01); B60K 2007/0038 (2013.01); B60K 2007/0092 (2013.01)

(58) Field of Classification Search
CPC .......... B60K 7/0007; B60K 2007/0038; B60K 2007/0092
See application file for complete search history.

(56) References Cited

U.S. PATENT DOCUMENTS

| | | | | | |
|---|---|---|---|---|---|
| 2,726,726 | A | * | 12/1955 | Le Tourneau ....... | B60K 17/043 310/67 R |
| 3,653,454 | A | * | 4/1972 | Nielsen ................ | B60K 7/0015 180/308 |
| 2013/0264861 | A1 | * | 10/2013 | Park ........................ | H02K 7/14 301/6.5 |

FOREIGN PATENT DOCUMENTS

| | | |
|---|---|---|
| CN | 106357053 | 5/2019 |
| CN | 110855073 | 2/2020 |
| JP | 2010-076752 | 4/2010 |
| JP | 2018-034713 | 3/2018 |
| KR | 10-2005-0115417 | 12/2005 |
| WO | 2016-179761 | 11/2016 |

* cited by examiner

*Primary Examiner* — Edwin A Young
(74) *Attorney, Agent, or Firm* — LEX IP MEISTER, PLLC

(57)                ABSTRACT
Disclosed is a power transmission device. The power transmission device includes power transmission device includes a drive motor comprising a motor housing, a rear cover, a stator, and a rotor. A motor shaft coupled to the rotor penetrates the front surface and rear cover, with a driving gear at one end protruding outside the motor housing. A drum surrounds the drive motor, featuring a drum circular plate portion and a cylindrical portion extending in the wheel axis direction. A drum cover is coupled to the drum and includes an outer-diameter portion with a driven gear that engages the driving gear. A wheel hub on which a tire is mounted is coupled to the drum to rotate together with it.

12 Claims, 18 Drawing Sheets

POWER TRANSMISSION DEVICE

TECHNICAL FIELD

The present disclosure relates to a power transmission device, and more particularly, to a power transmission device capable of being used for a wheel drive unit or the like.

BACKGROUND ART

Recently, in order to meet stricter regulations related to the environment and fuel economy, there has been an increasing use of environmental-friendly vehicles such as hybrid vehicles and electric vehicles. The environmental-friendly vehicle includes an electric motor as a power source, and the environmental-friendly vehicles with various shapes may be implemented depending on the arrangement of the electric motor and a speed reducer.

One of various solutions for disposing power sources of the environmental-friendly vehicles is a wheel drive unit in which the power source is disposed in a wheel hub or disposed at the periphery of the wheel hub. Because the wheel drive unit in the related art has a large size, a part of the wheel drive unit protrudes to the outside of the wheel hub, and the part of the wheel drive unit protruding to the outside of the wheel hub may interfere with components of the vehicle such as a suspension device or a braking device. Therefore, a vehicle body or a chassis needs to be modified in design to mount the wheel drive unit in the related art in the vehicle.

An in-wheel motor system has been developed to solve the above-mentioned problems. The in-wheel motor system refers to a system in which a speed reducer and an electric motor, which is a power source, are disposed in a wheel hub. According to the in-wheel motor system in the related art, a planetary gear set is mainly used as the speed reducer. However, it is difficult to dispose the electric motor, the planetary gear set, and a wheel bearing in the wheel hub. Therefore, an in-wheel motor system, which does not include the speed reducer, has been developed.

However, the in-wheel motor system, which does not include the speed reducer, requires an electric motor having a large capacity because the in-wheel motor system needs to start off the vehicle and drive the vehicle at high speed by using power of the electric motor. For this reason, the amount of consumption of electric power is large, which causes a limitation in a distance that the vehicle may travel on a single charge. A battery having a large capacity needs to be used to cope with this situation.

Meanwhile, in the case of the in-wheel motor system in which the electric motor directly operates the wheel hub, impact of a road surface, which is applied while the vehicle travels, is transmitted directly to the electric motor, which causes a problem with durability of the electric motor.

In addition, because the size and weight of the electric motor are increased, there is a problem in that the unsprung mass of the suspension device increases, and the ride quality deteriorates.

The above information disclosed in this Background section is only for enhancement of understanding of the background of the invention and therefore it may contain information that does not form the prior art that is already known in this country to a person of ordinary skill in the art.

Disclosure

Technical Problem

The present disclosure attempts to provide a compact, high-efficiency power transmission device capable of being installed in a space of a wheel hub by virtue of a small-sized speed reduction device and a small-sized drive motor and capable of satisfying start off performance and high-speed driving performance even by using a drive motor having a small capacity by using the speed reduction device having a simple configuration.

The present disclosure also attempts to provide a power transmission device capable of improving durability by minimizing impact of a road surface applied to a drive motor and capable of improving ride quality of a vehicle by reducing a weight of a wheel drive unit.

The present disclosure also attempts to provide a power transmission device equipped with an improved cooling system capable of dissipating heat generated from a drive motor.

Technical Solution

A power transmission device according to an embodiment of the present disclosure may include: a drive motor including a motor housing having a front surface, a rear cover coupled to a rear surface of the motor housing, a stator fixed in the motor housing and configured to generate a magnetic field, a rotor disposed inside the stator based on a diameter direction with a preset gap from the stator and configured to be rotated by the magnetic field generated by the stator, a motor shaft coupled to the rotor and configured to rotate together with the rotor, the motor shaft extending in a longitudinal direction and penetrating the front surface and the rear cover, and a driving gear provided at one end of the motor shaft penetrating the front surface and protruding to the outside of the motor housing; a drum configured to surround the drive motor and including a drum circular plate portion provided on one surface based on a wheel axis direction, and a cylindrical portion extending in the wheel axis direction from an outer diameter end of the drum circular plate portion; a drum cover coupled to the other surface of the drum based on the wheel axis direction and having an outer-diameter portion on which a driven gear engaging with the driving gear is provided; and a wheel hub on which a tire is mounted, the wheel hub being coupled to the drum and configured to rotate together with the drum.

The drive motor may be disposed to be directed downward so that a front surface thereof is closer to the ground surface than a rear surface thereof to the ground surface in a vertical direction, and the drive motor may further include a motor arm extending from the motor housing to the other side based on the wheel axis direction.

The motor arm may have a supply passageway for supplying oil into the drive motor, and a discharge passageway for discharging the oil in the drum to the outside.

An oil gallery may be disposed at an upper end of the motor housing, an oil supply hole may be formed in the motor housing and configured to allow the supply passageway and the oil gallery to communicate with each other, and the oil supplied through the supply passageway may be supplied to the drive motor through the oil gallery.

The oil gallery may have at least one first gallery hole and at least one second gallery hole, the first gallery hole may be disposed radially outward of the second gallery hole, and the first and second gallery holes may be alternately disposed.

A slot may be formed in an inner surface of the motor housing to allow the oil, which has passed through the first gallery hole, to flow to the front surface of the motor housing, and a stator core cooling hole may be formed in the stator to allow the oil, which has passed through the second gallery hole, to flow to the front surface of the motor housing.

At least one third gallery hole may be further formed in the oil gallery.

A front discharge hole may be formed in the front surface to discharge the oil in the motor housing to the drum outside the motor housing.

A resolver rotor may be formed at the other end of the motor shaft, which penetrates the rear cover and protrudes to the outside of the motor housing, and change physical values corresponding to a rotational speed of the motor shaft, a resolver stator may be mounted on an upper surface of the rear cover and measure the change in physical values generated by the resolver rotor, and a resolver cover may be mounted on the upper surface of the rear cover, mounted between the rear cover and the motor shaft, and configured to fluidly seal and protect the resolver rotor and the resolver stator.

The motor shaft may have a through-hole formed in a longitudinal direction, a resolver cover oil groove may be formed in a lateral surface of the resolver cover in the longitudinal direction, and an oil wall may protrude from the upper surface of the resolver cover and guides the oil, which is in the drum and churned by the driven gear, to the resolver cover oil groove and the through-hole.

At least one branch hole may be formed in the motor shaft and extend to an outer peripheral surface of the motor shaft from the through-hole.

A rear supply hole and a rear cover oil hole may be formed in the rear cover and guide the oil, which is guided to the resolver cover oil groove, into the motor housing.

The power transmission device may further include a suction motor configured to discharge the oil in the drum to the outside through the discharge passageway.

The power transmission device may further include a suction tube having a free end positioned to be lower than an oil level in the drum and connected to the suction motor through the discharge passageway.

The power transmission device may further include an oil filter connected to the suction tube and configured to filter out foreign substances in the oil sucked through the suction tube.

Advantageous Effects

According to the embodiment of the present disclosure, the motor shaft of the drive motor is disposed to be perpendicular to the wheel axis or disposed at any angle with respect to the direction perpendicular to the wheel axis, and the driving gear and the driven gear, which are respectively the pinion gear and the ring gear that engage with each other, are used as the speed reducer, such that the size of the power transmission device may be reduced. Therefore, the power transmission device may be installed in the space in the wheel hub while exhibiting sufficient driving power.

In addition, because the speed reduction device with the simple configuration is used, the power transmission efficiency may be improved, and the wheel drive unit may be light in weight, such that the ride quality may be improved.

In addition, the drive motor is fixed to the vehicle body or the suspension device by means of the motor arm integrally extending in the axial direction from the motor housing, such that the impact of the road surface applied to the drive motor may be minimized, and the durability of the drive motor may be improved.

In addition, the components for driving, controlling, and cooling the drive motor are installed in the motor housing, such that the power transmission device is easily mounted in the vehicle.

Various components of the drive motor are cooled by the oil circulating through the cooling system, and the oil is additionally cooled by the air in the drum, such that the efficiency in cooling the power transmission device may be improved.

Other effects, which may be obtained or expected by the embodiments of the present disclosure, will be directly or implicitly disclosed in the detailed description on the embodiments of the present disclosure. That is, various effects expected according to the embodiments of the present disclosure will be disclosed in the detailed description to be described below.

DESCRIPTION OF THE DRAWINGS

The embodiments in the present specification may be better understood with reference to the following description in conjunction with the accompanying drawings in which similar reference numerals indicate the same or functionally similar elements.

5            6

Figure 16:
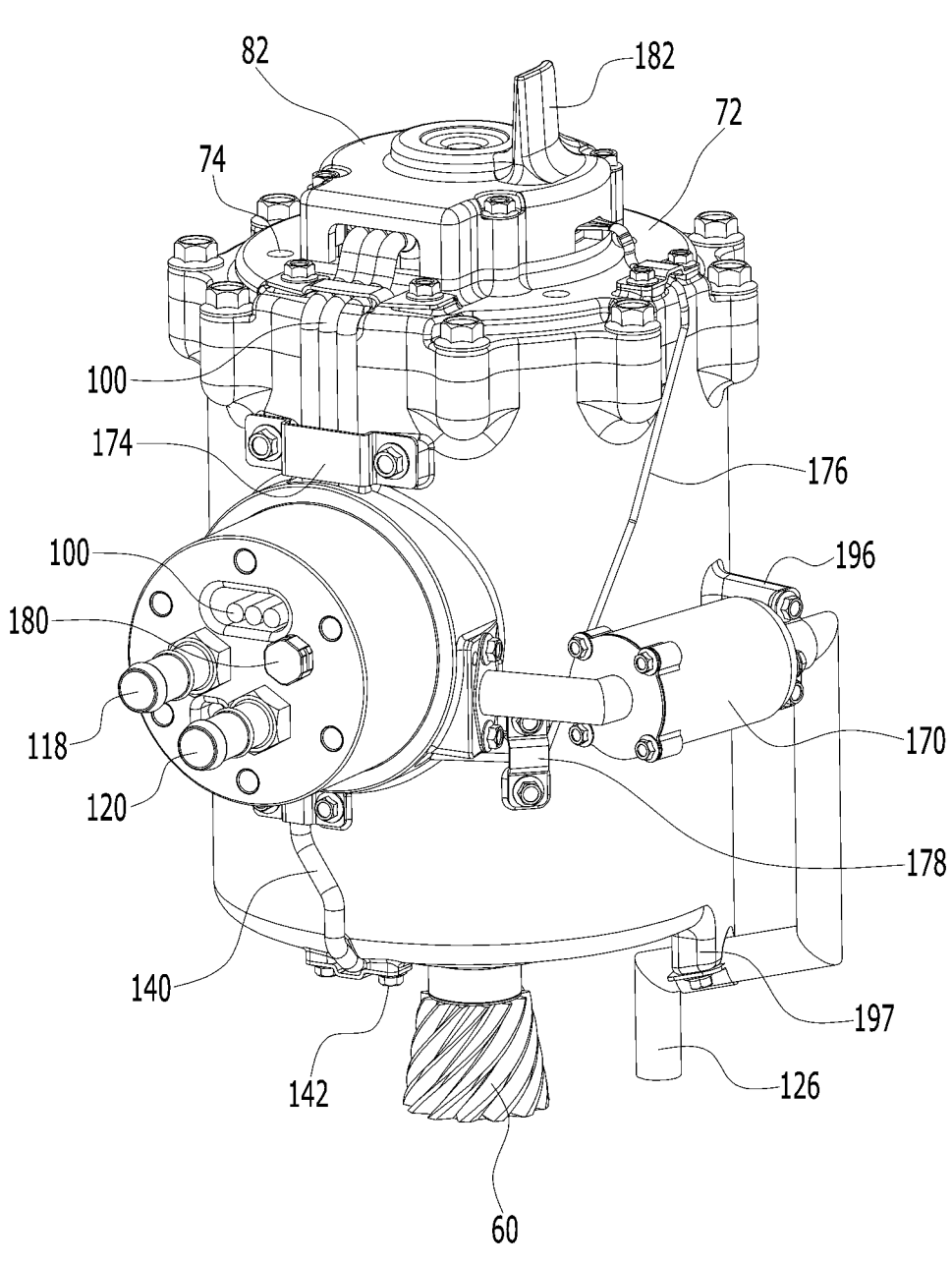

FIG. 16 is a perspective view of the drive motor of the power transmission device according to the embodiment of the present disclosure.

Figure 17:
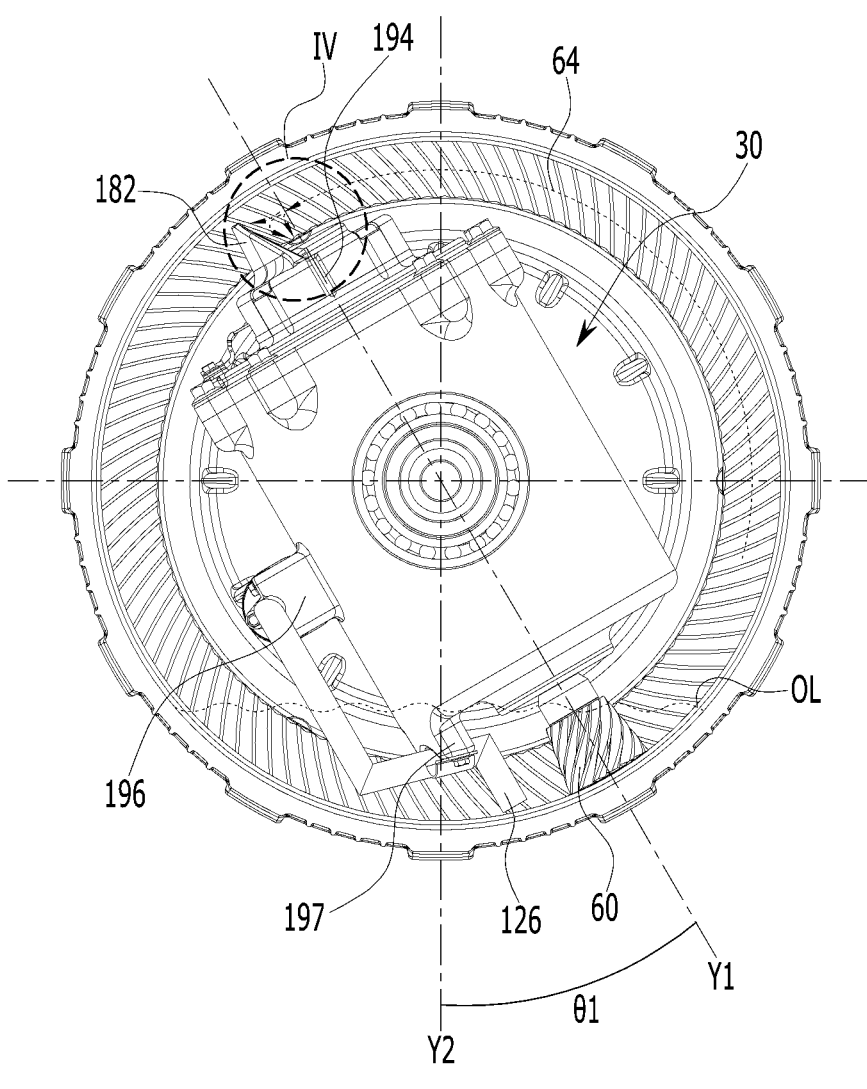

FIG. 17 is a schematic view illustrating a state in which the drive motor and the drum are coupled.

Figure 18:
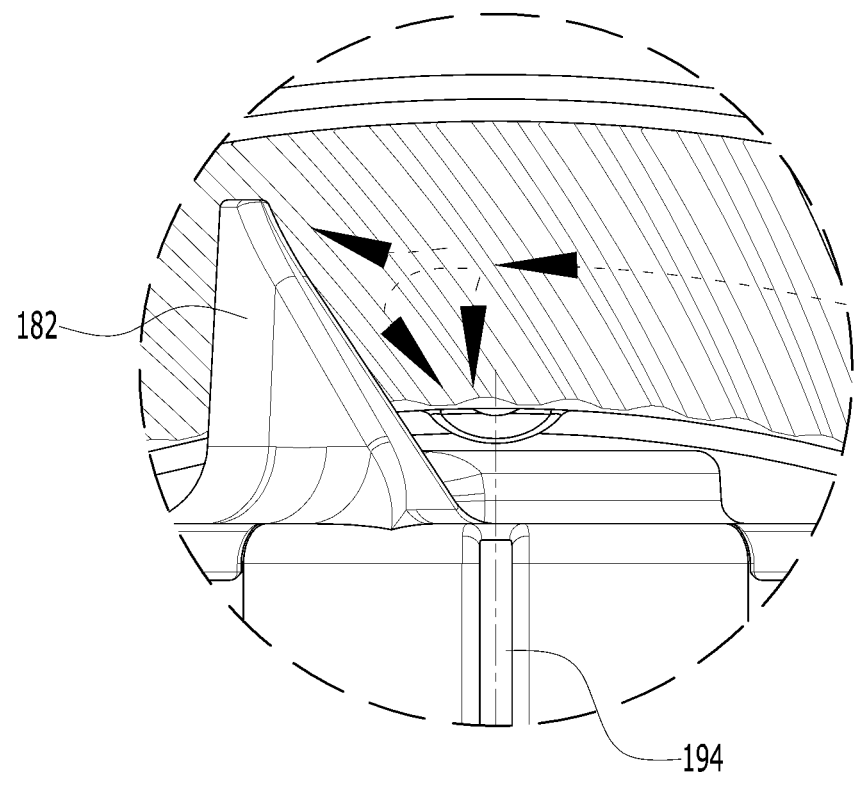

FIG. 18 is an enlarged view of part IV in FIG. 17.

It should be understood that the accompanying drawings are not necessarily to scale, but provide a somewhat simplified representation of various preferred features that exemplify the basic principles of the present disclosure. For example, specific design features of the present disclosure, including particular dimensions, directions, positions, and shapes, will be partially determined by the particularly intended application and use environment.

MODE FOR INVENTION

The terms used in the present specification are for explaining the exemplary embodiments, not for limiting the present disclosure. The singular expressions used herein are intended to include the plural expressions unless the context clearly dictates otherwise. It is to be understood that the term "comprise (include)" and/or "comprising (including)" used in the present specification means that the features, the integers, the steps, the operations, the constituent elements, and/or component are present, but the presence or addition of one or more of other features, integers, steps, operations, constituent elements, components, and/or groups thereof is not excluded. The term "and/or" used herein includes any one or all the combinations of one or more listed related items. Further, the term 'coupled' indicates a physical relationship between two components that are connected directly to each other or connected indirectly through one or more intermediate components.

The term "coupling means" or another similar term indicates a means configured to couple at least two members so that at least two members rotate together. Examples of the coupling means may include, but not limited to, bolts, nuts, welding, press-fitting, bonding, splines, and the like.

The term 'operably connected' or another similar term means that at least two members may be connected directly or indirectly to each other and transmit power. However, the two members, which are operably connected to each other, do not always rotate at the same speed and in the same direction.

The term such as "vehicle" or "vehicular" used herein or another similar term is generally understood as including passenger vehicles including sports utility vehicles (SUVs), buses, trucks, various commercial vehicles, various boats, ships including vessels, trains, aircraft, and the like and including hybrid electric vehicles, electric vehicles, plug-in hybrid electric vehicles, hydrogen power vehicles, and vehicles using alternative fuel (e.g., fuel obtained from resources other than petroleum). As referenced herein, the electric vehicle (EV) refers to a vehicle having electric power, as a part of driving power thereof, obtained from a rechargeable energy storage device (e.g., one or more rechargeable electrochemical cells or other types of batteries). The EVs are not limited to automobiles and may include motorcycles, carts, scooters, and the like. In addition, the hybrid vehicle refers to a vehicle (e.g., hybrid electric vehicle (HEV)) having two or more power sources, e.g., a gasoline-based power and an electricity-based power.

In addition, it is understood that one or more of the following methods or aspects thereof may be carried out by at least one control unit (e.g., electronic control unit (ECU) or controller. The term "control unit" or "controller" may refer to a hardware device including a memory and a processor. The memory is configured to store program instructions, and the processor is specially programmed to execute the program instructions to perform one or more processes described below in more detail. The control unit or controller may control operations of units, modules, components, devices, or the like, as described herein. In addition, it is understood that the following methods may be carried out by an apparatus including the control unit or controller as well as one or more other components, as recognized by those skilled in the art.

In addition, the control unit or controller of the present disclosure may be implemented as a non-transitory computer-readable recording medium containing executable program instructions executed by a processor. Examples of the computer-readable recording media include, but are not limited to, ROMs, RAMs, compact disc (CD)-ROMs, magnetic tapes, floppy disks, flash drives, smart cards, and optical data storage devices. The computer-readable recording medium can also be distributed in an overall computer network so that the program instruction may be stored and executed in a distributed manner, e.g., by a telematics server or a controller area network (CAN).

In a power transmission device according to an embodiment of the present disclosure, a motor shaft of a drive motor is disposed to be perpendicular to a wheel axis or disposed at any angle with respect to a direction perpendicular to the wheel axis, and a driving gear and a driven gear, which are respectively a pinion gear and a ring gear that engage with each other, are used as a speed reducer, such that the power transmission device may be installed in a space in a wheel hub. In addition, various components of the drive motor are cooled by oil circulating through a cooling system, and the oil is additionally cooled in a drum by air.

Hereinafter, a power transmission device according to an embodiment of the present disclosure will be described in detail with reference to the accompanying drawings.

Figure 1:
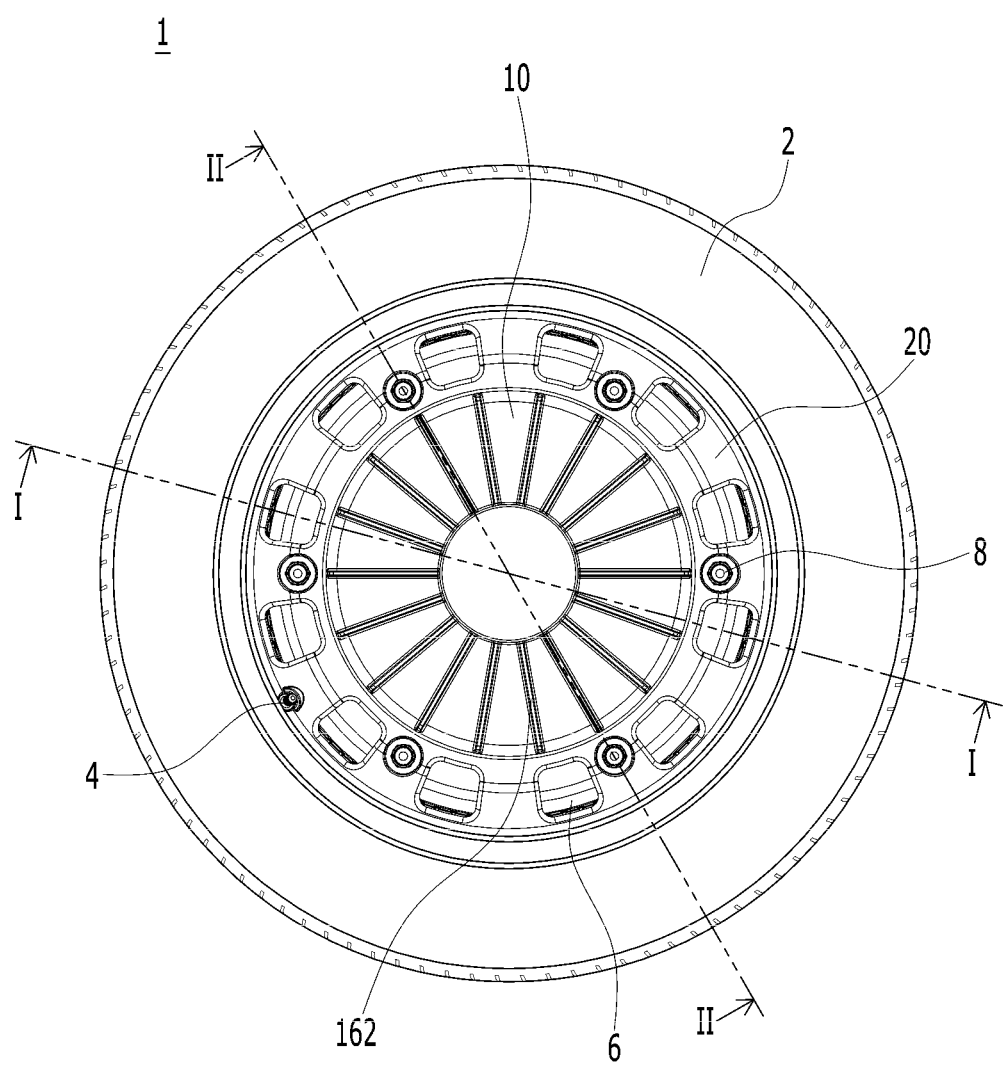
FIG. 1 is a front view of a power transmission device according to an embodiment of the present disclosure.
Figure 2:
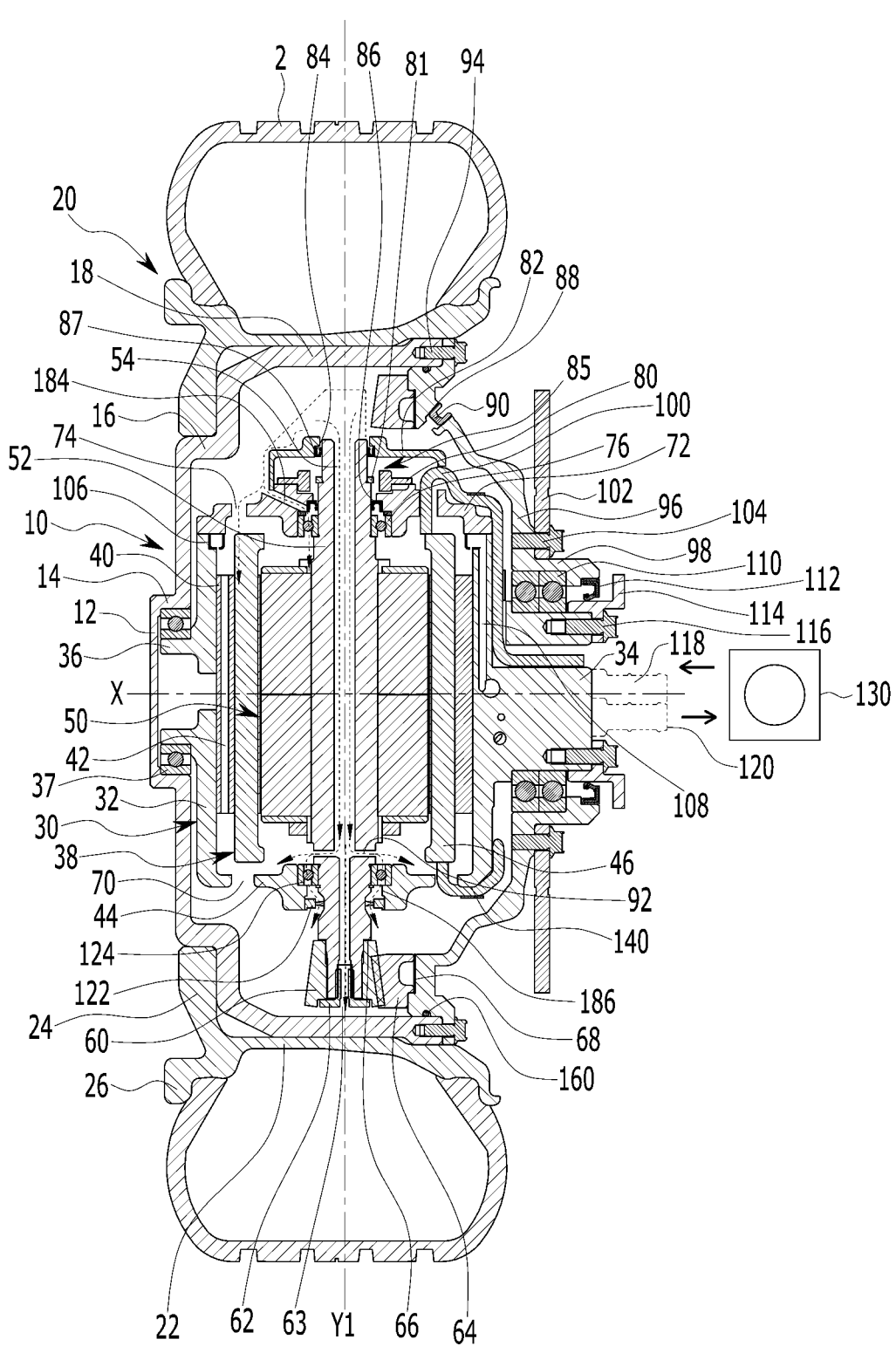
FIG. 2 is a cross-sectional view of the power transmission device according to the embodiment of the present disclosure.

As illustrated in FIGS. 1 and 2, a power transmission device 1 according to an embodiment of the present disclosure is mounted in a wheel and serves as a wheel drive unit. The power transmission device 1 includes a drive motor 30, a drum 10, a drum cover 96, and a wheel hub 20.

As illustrated in FIGS. 1, 2, 4, 14, and 15, the drive motor 30 is connected to a power source (not illustrated) such as a battery and configured to generate power for operating a vehicle. The drive motor 30 may be an electric motor including a motor housing 32, a stator 38, a rotor 50, and a motor shaft 52.

As illustrated in FIGS. 2, 4, 14, and 15, the motor housing 32 has a hollow cylindrical shape including a front surface 44, a lateral surface, and an opened rear surface. A mounting space for mounting the stator 38 and the rotor 50 is formed at the opened rear surface as a rear cover 72 is coupled to the rear surface by means of a coupling means such as bolting. As an example, the drive motor 30 may be disposed to be directed downward. That is, the front surface 44 is disposed to be closer to the ground surface than the rear surface to the ground surface. A front discharge hole 70 and a front hole 186 are formed in the front surface 44, and a rear supply hole 74 is formed in the rear cover 72. In addition, at least one slot 172 may be formed in an inner peripheral surface of the lateral surface and disposed in a longitudinal direction of the drive motor 30 (i.e., a direction Y1 in which the motor shaft 52 extends). The slot 172 may define some of cooling passageways in which the oil supplied into the motor housing 32 flows.

The motor housing 32 further includes a motor arm 34 extending from the lateral surface in a wheel axis direction X, and a bearing support portion 36. The bearing support portion 36 extends from the lateral surface toward one side based on the wheel axis direction X, and the motor arm 34 extends from the opposite side of the bearing support portion 36 toward the other side based on the wheel axis direction X.

Figure 5:
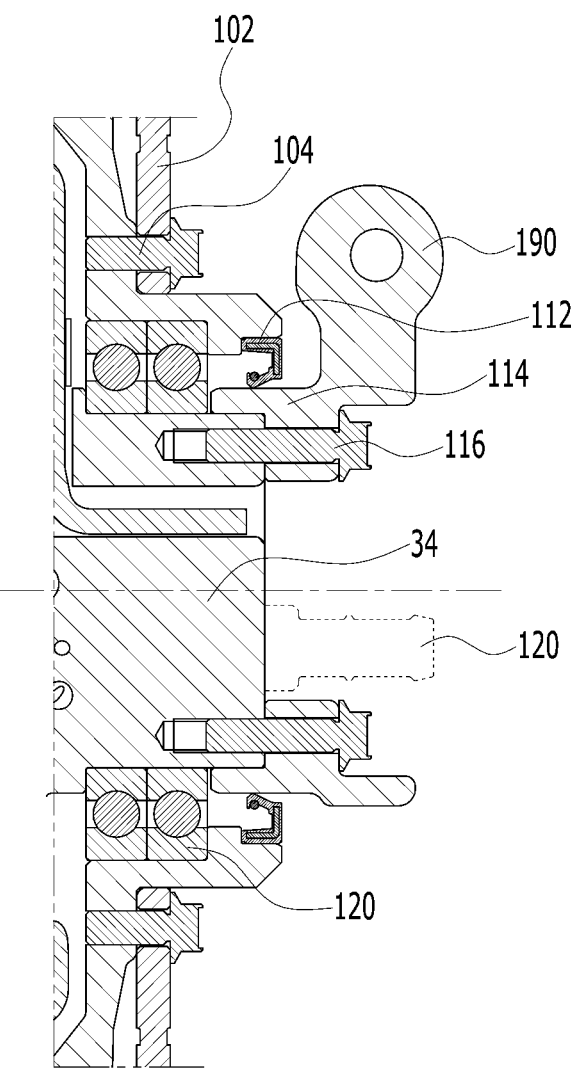
FIG. 5 is a partially cross-sectional view illustrating a state in which a knuckle is coupled to the power transmission device according to the embodiment of the present disclosure.
Figure 6:
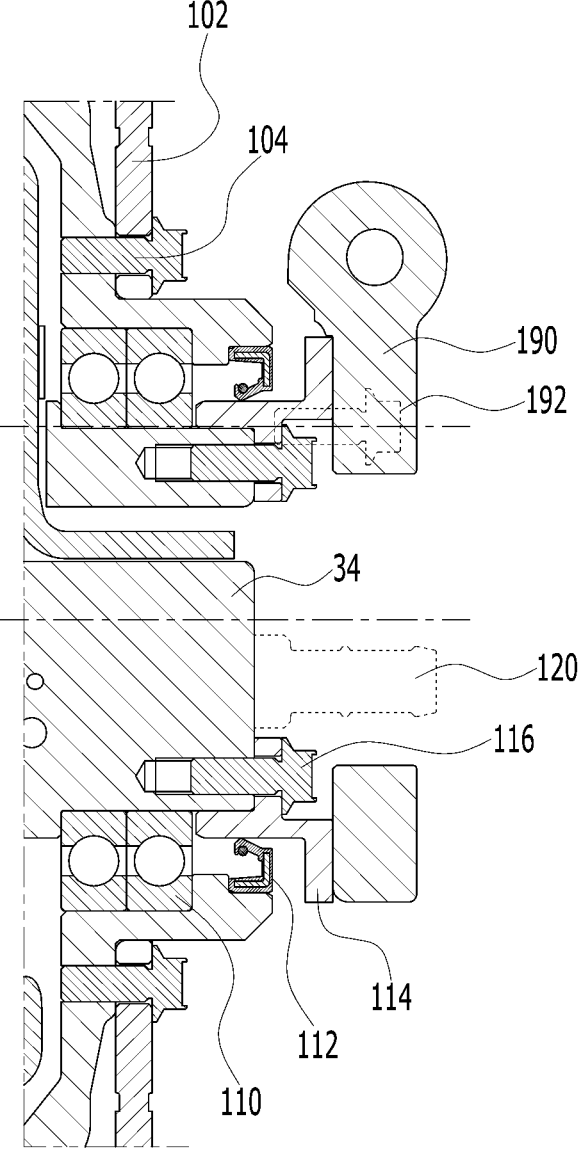
FIG. 6 is a partially cross-sectional view illustrating a state in which a knuckle is coupled to a power transmission device according to another embodiment of the present disclosure.

One end of the motor arm 34 may be integrated with the motor housing 32, and the other end of the motor arm 34 may extend toward the other side based on the wheel axis direction X and protrude to the outside of the wheel hub 20. The other end of the motor arm 34 may be fixed to a vehicle body (chassis) or a suspension device, e.g., a knuckle 190 by means of a flange 114. As an example, as illustrated in FIG. 5, the knuckle 190 is integrated with the flange 114, and the flange-integrated knuckle 190 is coupled to the other end of the motor arm 34 by means of a coupling means 116 such as bolting. As another example, as illustrated in FIG. 6, the flange 114 and the knuckle 190 are manufactured separately, the flange 114 is coupled to the other end of the motor arm 34 by means of the coupling means 116 such as bolting, and the knuckle 190 is coupled to the flange 114 by means of a coupling means 192 such as bolting.

In case that the drive motor 30 is fixed to the vehicle body or the suspension device such as the knuckle 190 by means of the motor arm 34, the impact, which is applied from a road surface while the vehicle travels, or the impact of the wheel, which is applied in the event of sudden acceleration or sudden braking, is not transmitted directly to the components, e.g., the stator 38, the rotor 50, and the like in the motor housing 32, such that the durability of the drive motor 30 and relevant components may be improved.

In addition, in case that the bearing support portion 36 and the motor arm 34 are provided at two opposite sides of the motor housing 32 based on the wheel axis direction X, the bearing support portion 36 and the motor arm 34 support two opposite sides of the drive motor 30 so that the impact or the like is not transmitted directly to the drive motor 30 from the road surface, such that the durability of the drive motor 30 may be further improved.

Figure 4:
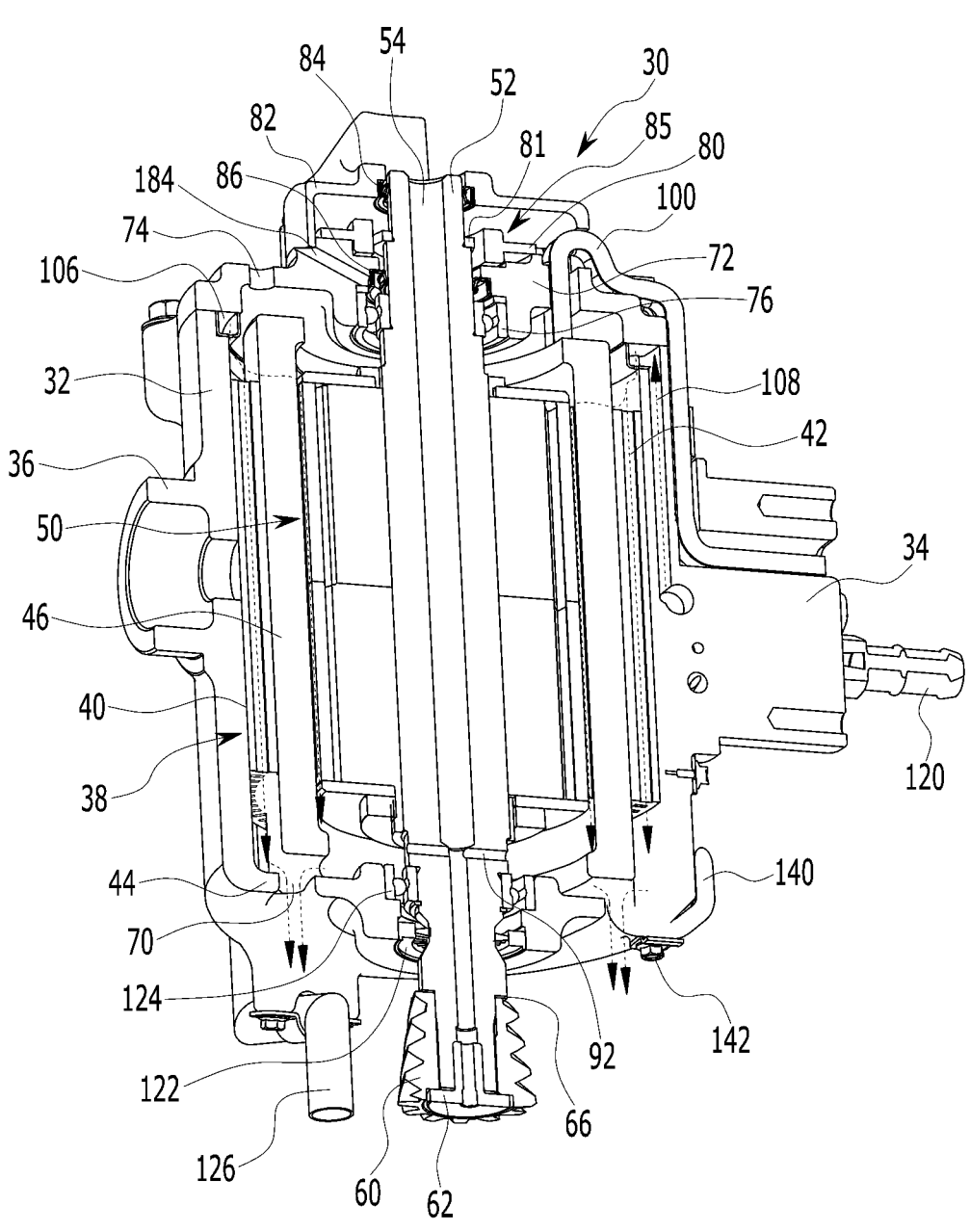
FIG. 4 is a cross-sectional view of the drive motor used for the power transmission device according to the embodiment of the present disclosure.

As illustrated in FIGS. 2 and 4, the stator 38 is disposed in the motor housing 32 and fixed to the motor housing 32. The stator 38 is connected to the power source and configured to form a magnetic field. The stator 38 includes a stator core 40, and a stator coil 46 configured to surround the stator core 40.

The stator core 40 has at least one stator core cooling hole 42 formed in a circumferential direction. The stator core cooling hole 42 may extend in the longitudinal direction of the drive motor 30 (i.e., the direction Y1 in which the motor shaft 52 extends) and define some of the cooling passageways through which the oil supplied to the motor housing 32 flows. As an example, only one of the stator core cooling hole 42 and the slot 172 of the motor housing 32 may be formed and used. That is, only the slot 172 of the motor housing 32 may be formed such that the oil supplied into the motor housing 32 may flow only through the slot 172, or only the stator core cooling hole 42 may be formed such that the oil supplied to the motor housing 32 may flow only through the stator core cooling hole 42. Alternatively, even when both the stator core cooling hole 42 of the slot 172 of the motor housing 32 are formed, the oil supplied to the motor housing 32 may flow only through one of the stator core cooling hole 42 and the slot 172 of the motor housing 32.

The stator coil 46 is connected to the power source through a power line 100. A temperature sensor (not illustrated) is mounted on the stator core 40 or the stator coil 46 and measures a temperature of the stator core 40 or the stator coil 46. The temperature sensor is connected to the control unit (not illustrated) through a temperature sensor line 140 and transmits a signal, which corresponds to the measured temperature of the stator core 40 or the stator coil 46, to the control unit. The control unit may perform a process of cooling the power transmission device 1 on the basis of the signal. As illustrated in FIG. 16, the power line 100 and the temperature sensor line 140 are embedded in the motor arm 34 and connected to the control unit or the power source, which is disposed outside the power transmission device 1, through the motor arm 34. Therefore, the power line 100 and the temperature sensor line 140 may be prevented from interfering with a rotary component in the power transmission device 1. Further, the power line 100 and the temperature sensor line 140 are not exposed to or come into contact with a high-temperature component or a lubricant, such that the durability and the control reliability may be improved.

As illustrated in FIGS. 2 and 4, the rotor 50 is disposed inside the stator 38 based on a diameter direction with a preset gap from the stator 38. The rotor 50 is configured to be rotated by the magnetic field generated by the stator 38. As an example, a permanent magnet may be attached to or embedded in an outer-diameter portion of the rotor 50. The drive motor 30 including the rotor 50 is called a permanent magnet synchronous motor (PMSM).

As illustrated in FIGS. 2 and 4, the motor shaft 52 penetrates a central portion of the rotor 50 and extends in the longitudinal direction Y1 of the drive motor 30, and a through-hole 54 is formed in the motor shaft 52. The motor shaft 52 is coupled to the rotor 50 and configured to rotate together with the rotor 50.

A lower end of the motor shaft 52 passes through the front hole 186 of the front surface 44 of the motor housing 32 and protrudes to the outside of the motor housing 32. A driving gear 60 is provided at the lower end of the motor shaft 52 protruding to the outside of the motor housing 32. The driving gear 60 may be manufactured separately from the motor shaft 52 and coupled to the lower end of the motor shaft 52 by means of a coupling means such as a fixing bolt 62 and/or a spline. Alternatively, the driving gear 60 may be integrated with the motor shaft 52. In case that the driving gear 60 is manufactured separately from the motor shaft 52 and coupled to the lower end of the motor shaft 52 by means of the fixing bolt 62, a first spacer 66 may be disposed between the motor shaft 52 and the driving gear 60. The first spacer 66 is configured to adjust a backlash or the like between the driving gear 60 and a driven gear 64. As an example, the driving gear 60 may be configured as a pinion gear of a spiral bevel gear. The fixing bolt 62 has a fixing bolt oil passageway 63 connected to the through-hole 54.

A bearing 124 for implementing a smooth rotation of the motor shaft 52 may be mounted between the motor shaft 52 and the front hole 186, and an anti-electric erosion device 122 for preventing a spark or electrical corrosion, which may occur on the bearing 124, may be mounted between the motor shaft 52 and the front hole 186.

A resolver 85 is disposed in the drive motor 30 and configured to measure a rotational speed of the motor shaft 52, i.e., a rotational speed of the drive motor 30 by changing physical values (e.g., changing magnetic poles or magnetic fields) corresponding to the rotational speed of the motor shaft 52. The resolver 85 includes a resolver rotor 81 attached to the motor shaft 52, and a resolver stator 80 mounted on the rear cover 72.

An upper end of the motor shaft 52 passes through a central portion of the rear cover 72 and protrudes to the outside of the motor housing 32. The resolver rotor 81 is mounted at the upper end of the motor shaft 52 protruding to the outside of the motor housing 32 and rotates together with the motor shaft 52. The resolver stator 80, which faces the resolver rotor 81 in the diameter direction, is mounted on an upper surface of the rear cover 72 to measure the rotational speed of the drive motor 30 by measuring the change in physical values generated by the resolver rotor 81. The resolver stator 80 transmits a signal, which corresponds to the rotational speed of the drive motor 30, to the control unit through a resolver signal line 176 (see FIG. 16).

A resolver cover 82 is further mounted on the upper surface of the rear cover 72 to protect the resolver stator 80. The resolver cover 82 surrounds the resolver stator 80 and is fixed to the rear cover 72 by means of a coupling means such as bolting. In addition, as illustrated in FIGS. 17 and 18, an oil wall 182 protrudes upward in a preset shape from an upper surface of the resolver cover 82, and a resolver cover oil groove 194 is formed in a lateral surface of the resolver cover 82 in the longitudinal direction Y1 of the drive motor 30. The oil wall 182 blocks a flow of oil churned and rotated in the drum 10 and guides the oil to the through-hole 54 and the resolver cover oil groove 194.

A resolver cover hole 87 is formed in a central portion of the upper surface of the resolver cover 82, and the upper end of the motor shaft 52 is inserted into the resolver cover hole 87. An inner peripheral surface of the resolver cover hole 87 and an outer peripheral surface of the upper end of the motor shaft 52 are spaced apart from each other, and a sealing member 84 is disposed between the inner peripheral surface of the resolver cover hole 87 and the outer peripheral surface of the upper end of the motor shaft 52 to prevent the oil or the like, which is captured by the oil wall 182, from penetrating into a space defined by the resolver cover 82 and the motor shaft 52.

Between the inner peripheral surface of the rear cover 72 and the outer peripheral surface of the motor shaft 52, a bearing 76 for implementing the smooth rotation of the motor shaft 52 is disposed, and a sealing member 86 for preventing the oil or the like from penetrating into a space in which the resolver 85 is disposed. The sealing member 86 is disposed above the bearing 76. As illustrated in FIGS. 2 and 4, a rear cover oil hole 184 is formed in the rear cover 72 and connects the upper surface of the rear cover 72 and the inner peripheral surface of the rear cover 72. The rear cover oil hole 184 allows a part of the oil, which flows downward along the resolver cover oil groove 194, to flow between the bearing 76 and the sealing member 86 to lubricate and cool the bearing 76. In addition, because the sealing member 86 is disposed above the bearing 76, the sealing member 86 prevents the oil, which flows between the bearing 76 and the sealing member 86, from penetrating into the space in which the resolver 85 is disposed.

A filter (not illustrated) may be mounted on the rear cover 72 and the resolver cover 82 to prevent impurities, which are mixed with the oil churned in the drum 10, from being introduced into the drive motor 30 through the through-hole 54, the rear supply hole 74, and the rear cover oil hole 184. In addition, a filter (not illustrated) may be installed in the front discharge hole 70 and the fixing bolt oil passageway 63 to prevent impurities, which are mixed with the oil in the drum 10, from being introduced into the drive motor 30.

Meanwhile, as illustrated in FIG. 16, both the power line 100 and the resolver signal line 176 pass through the resolver cover 82 and then are embedded in the motor arm 34. However, a position, at which the power line 100 passes through the resolver cover 82, and a position, at which the power line 100 is embedded in the motor arm 34, are distant from a position, at which the resolver signal line 176 passes through the resolver cover 82, and a position at which the resolver signal line 176 is embedded in the motor arm 34. The power line 100 and the resolver signal line 176 are installed to be spaced apart from each other, which makes it possible to prevent electric power, which is supplied to the drive motor 30 through the power line 100, from acting as noise of a signal transmitted through the resolver signal line 176. Therefore, the control reliability may be improved.

In addition, all the power line 100, the temperature sensor line 140, and the resolver signal line 176 are embedded in the motor arm 34 and connected to the control unit or the power source, which is disposed outside the power transmission device 1, through the motor arm 34. Therefore, the power line 100, the temperature sensor line 140, and the resolver signal line 176 may be prevented from interfering with the rotary component in the power transmission device 1. Further, the power line 100, the temperature sensor line 140, and the resolver signal line 176 are not exposed to or do not come into contact with a high-temperature component or a lubricant, such that the durability and the control reliability may be improved.

In order to implement well-organized wiring, the power line 100 may be in close contact with the motor housing 32 by means of a power line holder 174, the resolver signal line 176 may be in close contact with the motor housing 32 by means of a resolver signal line holder 178, and the temperature sensor line 140 may be in close contact with the motor housing 32 by means of a temperature sensor line holder 142.

The through-hole 54 is formed in the motor shaft 52 in the longitudinal direction Y1 of the drive motor 30. At least one branch hole 92 is formed at a preset position in the through-hole 54 and extends to the outer peripheral surface of the motor shaft 52 from the through-hole 54. The cooling oil is introduced into the through-hole 54 through the upper end of the motor shaft 52 and cools the drive motor 30, particularly the rotor 50 while flowing from upside to downward along the through-hole 54. In addition, a part of the oil flows to the outside of the motor shaft 52 through at least one branch hole 92 formed at the preset position in the through-hole 54 and lubricates and cools the bearing 124. In addition, the remaining part of the oil flows to the lower end of the motor shaft 52 along the through-hole 54 and is discharged to the outside of the motor shaft 52. To this end, the fixing bolt 62, which couples the driving gear 60 to the motor shaft 52, may have the fixing bolt oil passageway 63 that may communicate with the through-hole 54 and discharge the oil to the outside of the motor shaft 52.

As illustrated in FIGS. 2 and 17, the drive motor 30 may be disposed to be directed downward. That is, the front surface 44 of the drive motor 30 is disposed below the rear surface of the drive motor 30 based on a direction Y2 perpendicular to the ground surface. In addition, the motor shaft 52 may be disposed in the direction Y2 perpendicular to the ground surface or disposed at any angle θ1 with respect to the direction Y2 perpendicular to the ground surface. As an example, the angle θ1 between the direction Y1 of the motor shaft 52 and the direction Y2 perpendicular to the ground surface may be, but not limited to, ±45°. In this case, the sign '+' means that the direction Y1 of the motor shaft 52 is advanced counterclockwise relative to the direction Y2 perpendicular to the ground surface, and the sign '−' means that the direction Y1 of the motor shaft 52 is retarded clockwise relative to the direction Y2 perpendicular to the ground surface. Furthermore, the drive motor 30 may be installed at a right angle or an angle close to the right angle with respect to the wheel axis direction X. As an example, an angle between the longitudinal direction Y1 of the drive motor 30 and the wheel axis direction X may be, but not limited to, 90°±20°. Typically, because a diameter of the wheel hub 20 is larger than an axial width of the wheel hub 20, the drive motor 30 may be disposed in the space in the wheel hub 20 when the drive motor 30 is disposed as described above. In addition, when the drive motor 30 is disposed to be directed downward, the means (e.g., the oil wall 182 or the like) for guiding the oil, which is churned in the drum 10, to the through-hole 54 may be disposed above the drive motor 30. Therefore, it is possible to implement a smooth flow of oil for cooling and lubrication.

As illustrated in FIGS. 1 to 3 and 7 to 9, the drum 10 defines a space in which the drive motor 30 is mounted. The drum 10 is formed in an approximately cylindrical shape that surrounds the drive motor 30. The drum 10 includes a drum circular plate portion 12 and a cylindrical portion 18.

Figure 3:
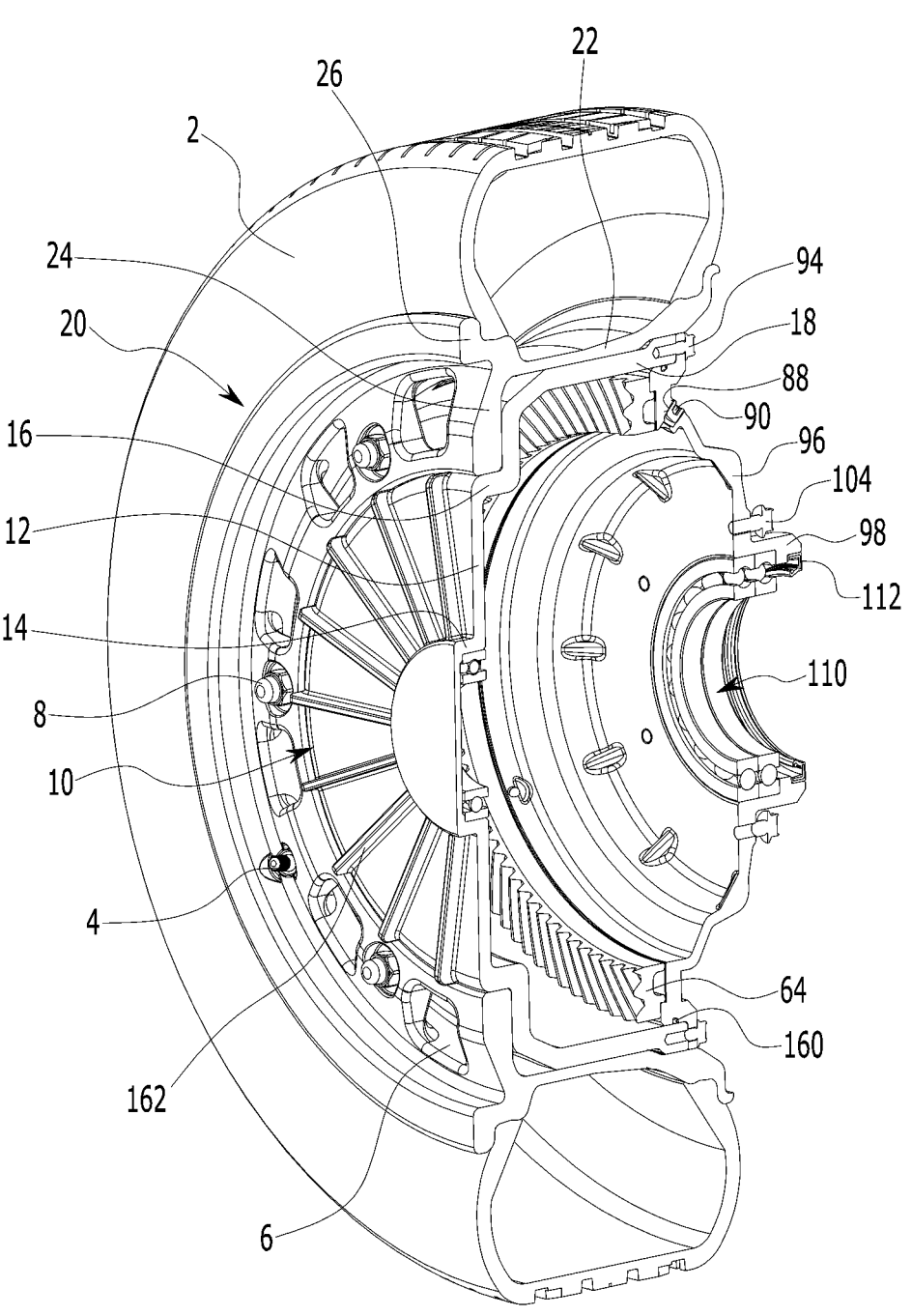
FIG. 3 is a partially cut-away view of the power transmission device according to the embodiment of the present disclosure in a state in which a drive motor is excluded.
Figure 9:
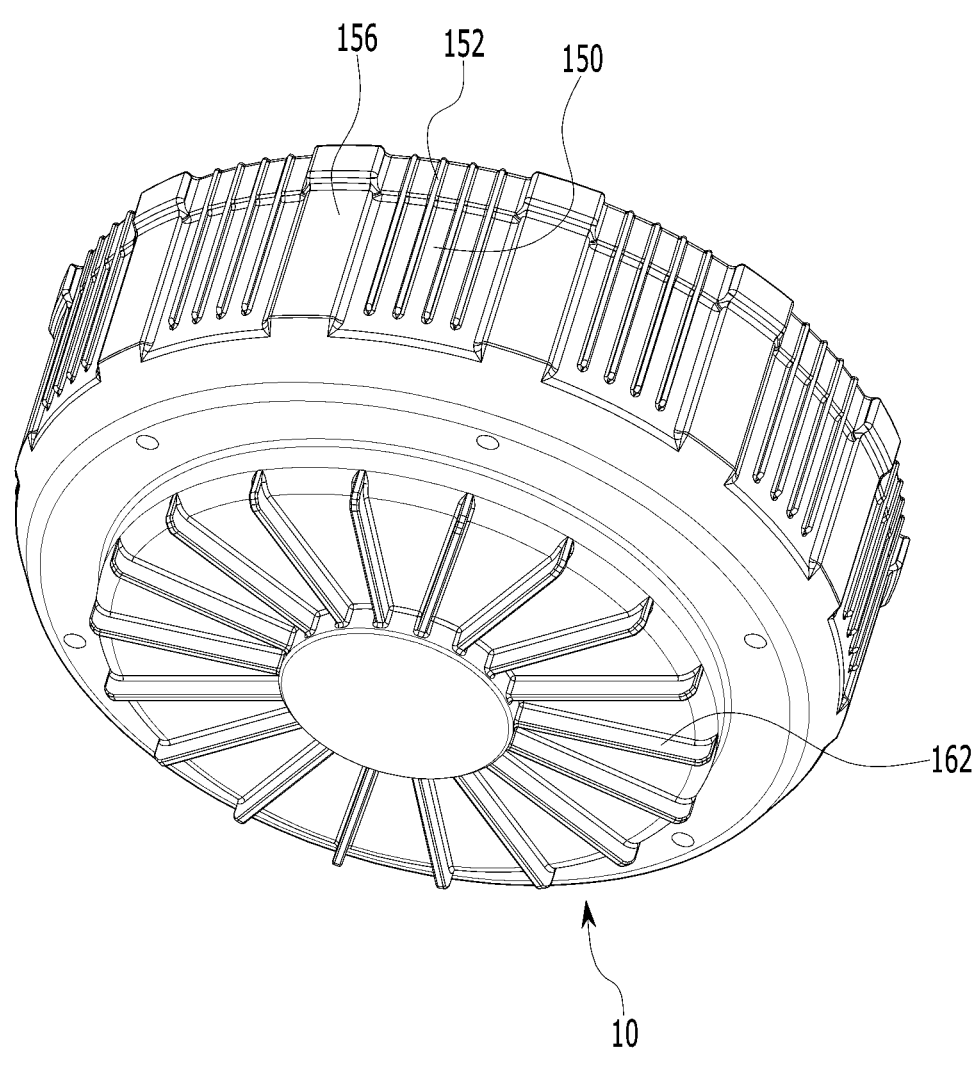
FIG. 9 is a perspective view of a drum of the power transmission device according to the embodiment of the present disclosure.

The drum circular plate portion 12 is formed in an approximately circular plate shape on one surface in the wheel axis direction X1 and includes first and second stepped portions 14 and 16. The first stepped portion 14 is positioned radially inward of the second stepped portion 16. That is, the drum circular plate portion 12 extends outward in the diameter direction from the wheel axis X1, protrudes from the first stepped portion 14 to the other side in the wheel axis direction X1, extends outward again in the diameter direction, protrudes again from the second stepped portion 16 to the other side in the wheel axis direction X1, and extends outward again in the diameter direction. The first stepped portion 14 faces the bearing support portion 36 in the diameter direction. A bearing 37 is disposed between the first stepped portion 14 and the bearing support portion 36, such that the drum 10 is disposed to be rotatable relative to the drive motor 30. A coupling means, such as a bolt 8 to be coupled to the wheel hub 20, may be integrated with or provided separately from the drum circular plate portion 12. As illustrated in FIGS. 3 and 9, at least one drum rib 162 extends in the diameter direction from the drum circular plate portion 12 between the first stepped portion 14 and the second stepped portion 16. The drum rib 162 not only serves to reinforce the rigidity of the drum 10 but also serves as a fin for dissipating heat in the drum 10 to the outside of the drum 10.

Figure 7:
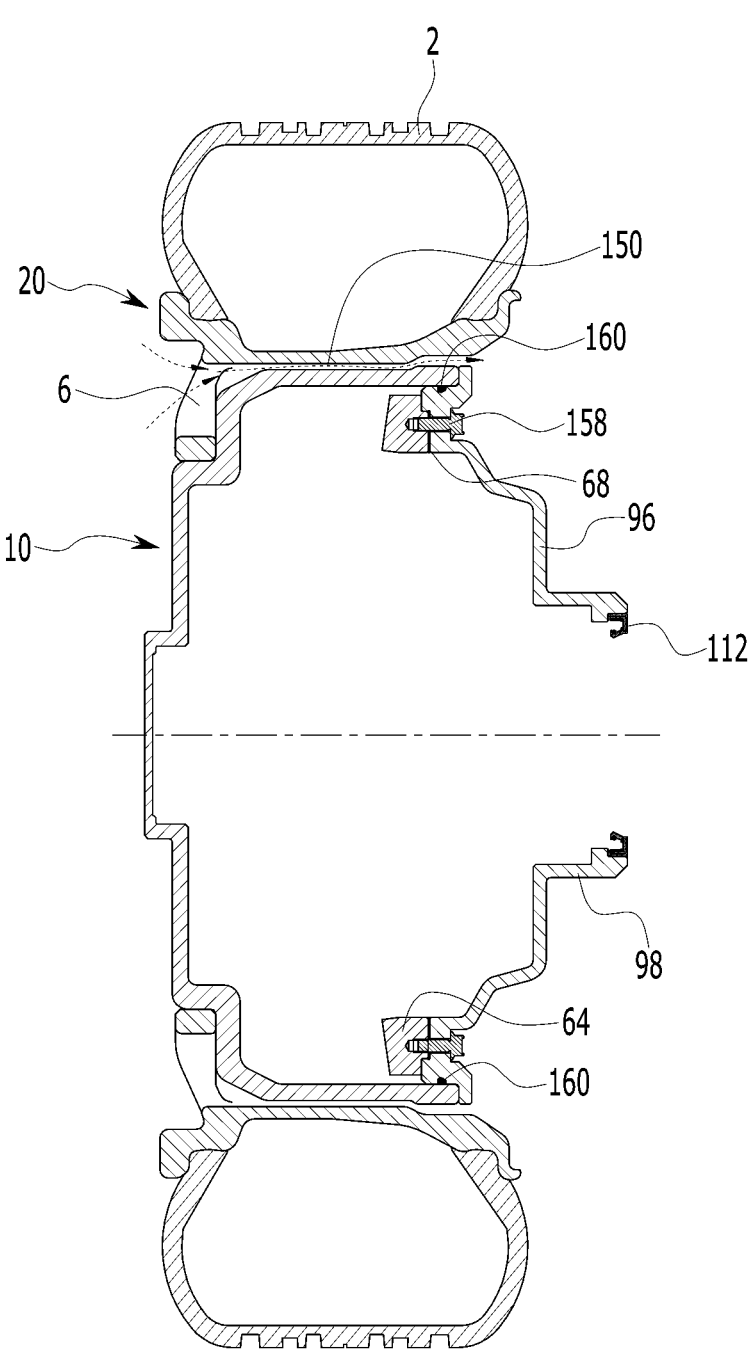
FIG. 7 is a cross-sectional view taken along line I-I and illustrating the power transmission device in FIG. 1 from which the drive motor is excluded.
Figure 8:
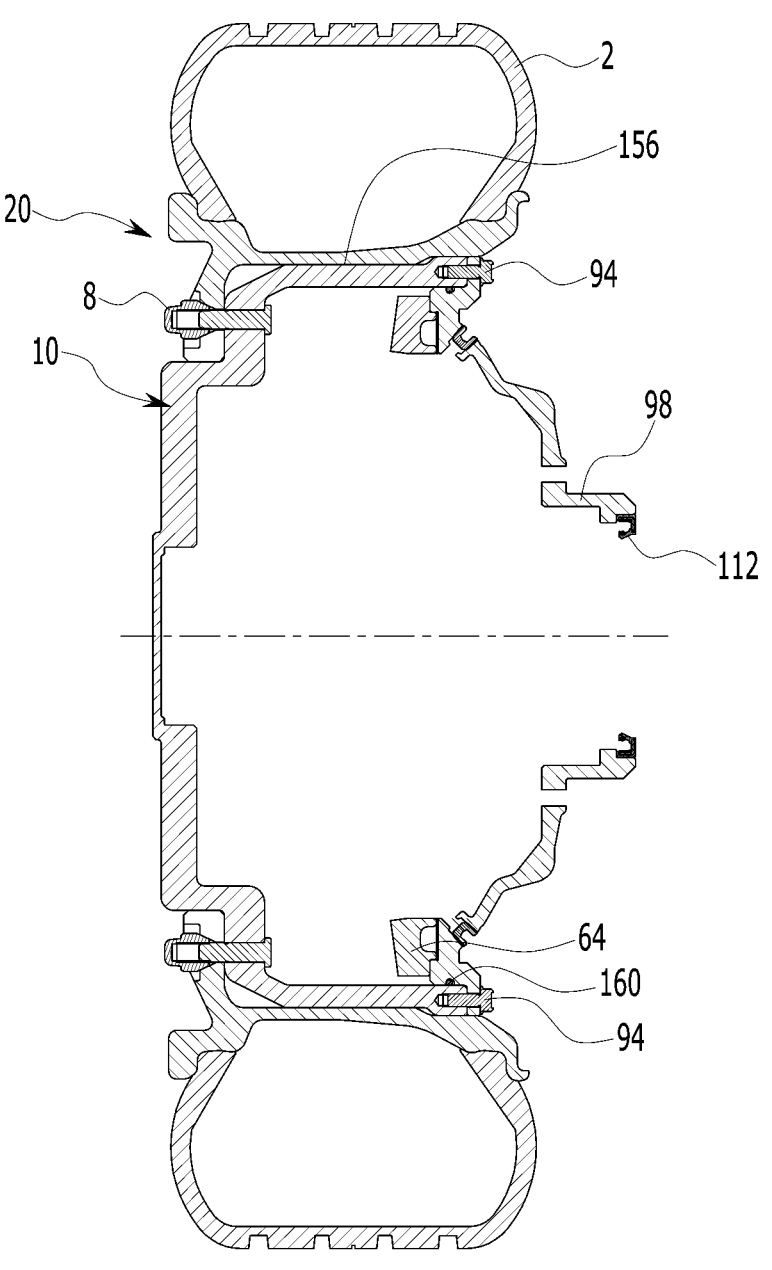
FIG. 8 is a cross-sectional view taken along line II-II and illustrating the power transmission device in FIG. 1 from which the drive motor is excluded.

The cylindrical portion 18 extends from an outer diameter end of the drum circular plate portion 12 to the other side based on the wheel axis direction X1. Therefore, the space in which the drive motor 30 is mounted is formed in the drum 10. As illustrated in FIGS. 7 to 9, drum support portions 156 are provided on the cylindrical portion 18 and disposed at preset intervals in the circumferential direction, and the drum support portions 156 protrude outward in the diameter direction. The drum support portions 156 extend in the wheel axis direction X1, come into contact with an inner peripheral surface of the wheel hub 20, and support the wheel hub 20. At least one drum fin 152 protrudes outward in the diameter direction between the adjacent drum support portions 156. The drum fin 152 extends in the wheel axis direction X1. An air passageway 150 is formed between the adjacent drum fins 152 or between the adjacent drum fins 152 and the drum support portion 156 and extends in the wheel axis direction X1. The air, which is introduced between the wheel hub 20 and the drum 10 through an air inlet port 6 of the wheel hub 20, cools the oil in the drum 10 while passing through the air passageways 150. That is, the oil in the drum 10 is cooled by the air passing through the air passageways 150.

As illustrated in FIGS. 2, 3, 7, and 8, the other surface of the drum 10 based on the wheel axis direction X1 is opened, and the drum cover 96 is coupled to the other surface of the drum 10. The drum cover 98 is formed in an approximately circular plate shape and includes a drum cover support surface 98. An outer diameter end of the drum cover 96 is in contact with the other end of the cylindrical portion 18 of the drum 10 and coupled by a coupling means such as a bolt 94 or the like. A sealing member 160 is disposed between the outer diameter end of the drum cover 96 and the other end of the cylindrical portion 18 of the drum 10 and prevents the oil in the drum 10 from leaking to the outside of the drum.

An oil injection/discharge hole 88 is formed at a preset position on the drum cover 96, and a closure 90 is detachably coupled to the oil injection/discharge hole 88. A user may separate the closure 90 from the oil injection/discharge hole 88 and inject the oil into the drum 10 through the oil injection/discharge hole 88. The user closes the oil injection/discharge hole 88 with the closure 90 after injecting the oil. As described above, the inside of the drum 10 is filled with an appropriate amount of oil in advance through the oil injection/discharge hole 88, which may make it easy to circulate the oil during a process of initially starting the vehicle. The oil injection/discharge hole 88 may also be used to discharge the oil in the drum 10 to the outside during the maintenance of the power transmission device 1.

The drum cover support surface 98 extends from an inner peripheral surface of the drum cover 96 to the other side based on the wheel axis direction X. The drum cover support surface 98 is disposed outside the motor arm 34 based on the diameter direction and surrounds at least a part of the motor arm 34. Because a diameter of the drum cover support surface 98 is larger than a diameter of the motor arm 34, the drum cover support surface 98 is spaced apart from the motor arm 34 and faces the motor arm 34 in the diameter direction.

A bearing 110 is disposed between the drum cover support surface 98 and the motor arm 34, such that the drum cover 96 is disposed to be rotatable relative to the drive motor 30. In order to fix a position of the bearing 110, a stepped portion may be formed at the other end of the drum cover support surface 98 and bent radially inward. In addition, when necessary, a snap ring may be installed on the drum cover support surface 98 and/or the motor arm 34 to fix the position of the bearing 110.

A sealing member 112 is disposed at the other side of the bearing 110 based on the wheel axis direction X to prevent moisture or outside foreign substances from being introduced into the bearing 110. For example, the sealing member 112 may be installed between the drum cover support surface 98 and the flange 114 coupled to the other end of the motor arm 32.

The brake disc 102 for braking may be mounted on the drum cover 96. For example, the brake disc 102 may be mounted on the other side surface of the drum cover 96 by a coupling means such as a bolt 104. The brake disc 102 is mounted on the drum cover 96 by the coupling means 104 and rotates together with the drum cover 96. When the vehicle is braked, the braking is applied by a braking means (not illustrated) restricts a rotation of the brake disc 102.

The driven gear 64 is provided on one side surface of an outer-diameter portion of the drum cover 96. The driven gear 64 may be manufactured separately from the drum cover 96 and coupled to the drum cover 96 by means of a coupling means such as a bolt 158 and/or a spline. Alternatively, the driven gear 64 may be integrated with the drum cover 96. In case that the driven gear 64 is manufactured separately from the drum cover 96 and coupled to the drum cover 96 by means of the bolt 158, a second spacer 68 may be disposed between the drum cover 96 and an outer peripheral surface of the driven gear 64. The second spacer 66 is configured to adjust a backlash or the like between the driving gear 60 and the driven gear 64. As an example, the driven gear 64 may be configured as a ring gear of the spiral bevel gear.

The driven gear 64 engages with the driving gear 60 in the wheel axis direction X. Therefore, the drum cover 96 rotates about the wheel axis X by receiving power from the drive motor 30, and the drum 10 coupled to the drum cover 96 is also rotated about the wheel axis X by the power. In addition, the bearing 37 is disposed between the first stepped portion 14 of the drum 10 and the bearing support portion 36 of the motor housing 32, and the bearing 110 is disposed between the drum cover 96 and the motor arm 34 of the motor housing 32, such that the motor housing 32 is fixed to the chassis, the vehicle body, or the suspension device, whereas the drum 10 and the drum cover 96 are smoothly rotatable.

Because the number of gear teeth of the driven gear 64 is larger than the number of gear teeth of the driving gear 60, the rotational speed decreases while the power is transmitted from the drive motor 30 to the drum cover 96. That is, according to the embodiment of the present disclosure, it is possible to obtain a reduction ratio required to start off the vehicle or drive the vehicle at high speed by means of the driving gear 60 and the driven gear 64 that engage with each other. Therefore, the small-scale, lightweight power transmission device 1 may be implemented by means of a speed reduction device with a simple structure.

The driving gear 60 and the driven gear 64 may be a pair of bevel gears, spiral bevel gears, or the like. As described above, the power transmission device 1 according to the embodiment of the present disclosure may obtain a necessary reduction ratio only by using a pair of gears and thus obtain high power transmission efficiency in comparison with a wheel driving system using planet gears and a multi-stage speed reducer.

As illustrated in FIGS. 1 to 3, 7, and 8, the wheel hub 20 is operatively connected to the drum 10 and receives power from the drum 10. The wheel hub 20 finally outputs power while being rotated about the wheel axis X by the power. The wheel hub 20 has an approximately cylindrical shape and includes a shoulder portion 22, a coupling portion 24, and tire mounting portions 26. The shoulder portion 22, the coupling portion 24, and the tire mounting portions 26 may be integrated.

The shoulder portion 22 extends in the wheel axis direction X and defines a space in which the power transmission device 1 may be disposed. The shoulder portion 22 defines an axial width of the wheel hub 20. The drive motor 30, the drum 10, and the drum cover 96 may be mostly disposed within the axial width at least defined by the shoulder portion 22. Therefore, it is possible to minimize the number of components disposed outside the axial width of the wheel hub 20, thereby minimizing interference between the power transmission device 1 and the components of the vehicle. Therefore, the power transmission device 1 is very easily mounted on the chassis or the vehicle body of the vehicle.

The shoulder portion 22 may be press-fitted into the cylindrical portion 18 of the drum 10.

The coupling portion 24 extends radially inward from one end of the shoulder portion 22 and is coupled to the drum circular plate portion 12 of the drum 10 by means of a coupling means such as press-fitting or the bolt 8. As illustrated in FIGS. 1, 3, and 7, a plurality of air inlet ports 6 is formed in circumferential direction in the coupling portion 24, and the air inlet ports 6 communicate with the air passageways 150. Therefore, the air introduced between the wheel hub 20 and the drum 10 through the air inlet ports 6 cools the oil in the drum 10 while passing through the air passageways 150.

The tire mounting portions 26 protrude outward in the diameter direction from two opposite ends of the shoulder portion 22 based on the wheel axis direction X. A tire 2 is mounted on the tire mounting portions 26. The tire 2 may be a rubber tire, a urethane wheel, or the like.

An air injection device 4 may be mounted on the wheel hub 10 to inject air into the tire 2.

Meanwhile, according to another embodiment of the present disclosure, the wheel hub 20 may be excluded, and the tire 2 may be mounted directly on the drum 10.

Hereinafter, a cooling device of the power transmission device 1 according to the embodiment of the present disclosure will be described in more detail.

As illustrated in FIGS. 2, 4, and 16, the cooling device of the power transmission device 1 is connected to an external cooling system (not illustrated) disposed outside the power transmission device 1 and receives oil from the cooling system. The oil, which is heated while cooling the components in the power transmission device 1, is discharged to the cooling system. Therefore, the oil circulates through the external cooling system and the cooling device of the power transmission device 1.

The motor arm 34 of the drive motor 30 has a supply passageway 118 and a discharge passageway 120. The oil is supplied into the drive motor 30 through the supply passageway 118 and discharged from the power transmission device 1 through the discharge passageway 120. The discharge passageway 120 is connected to a suction motor 130, and the suction motor 130 sucks the oil in the drum 10 through the discharge passageway 120.

An oil supply hole 108 is formed in the lateral surface of the motor housing 32 and connected to the supply passageway 118. An oil gallery 106 is disposed at an upper end of the motor housing 32, and the oil supply hole 108 extends to the upper end of the motor housing 32 and communicates with the oil gallery 106. Therefore, the oil supplied into the drive motor 30 through the supply passageway 118 is supplied to the oil gallery 106 through the oil supply hole 108. An oil gallery mounting portion 173 is formed at an inner-upper end of the motor housing 32 and supports the oil gallery 106.

Figure 10:
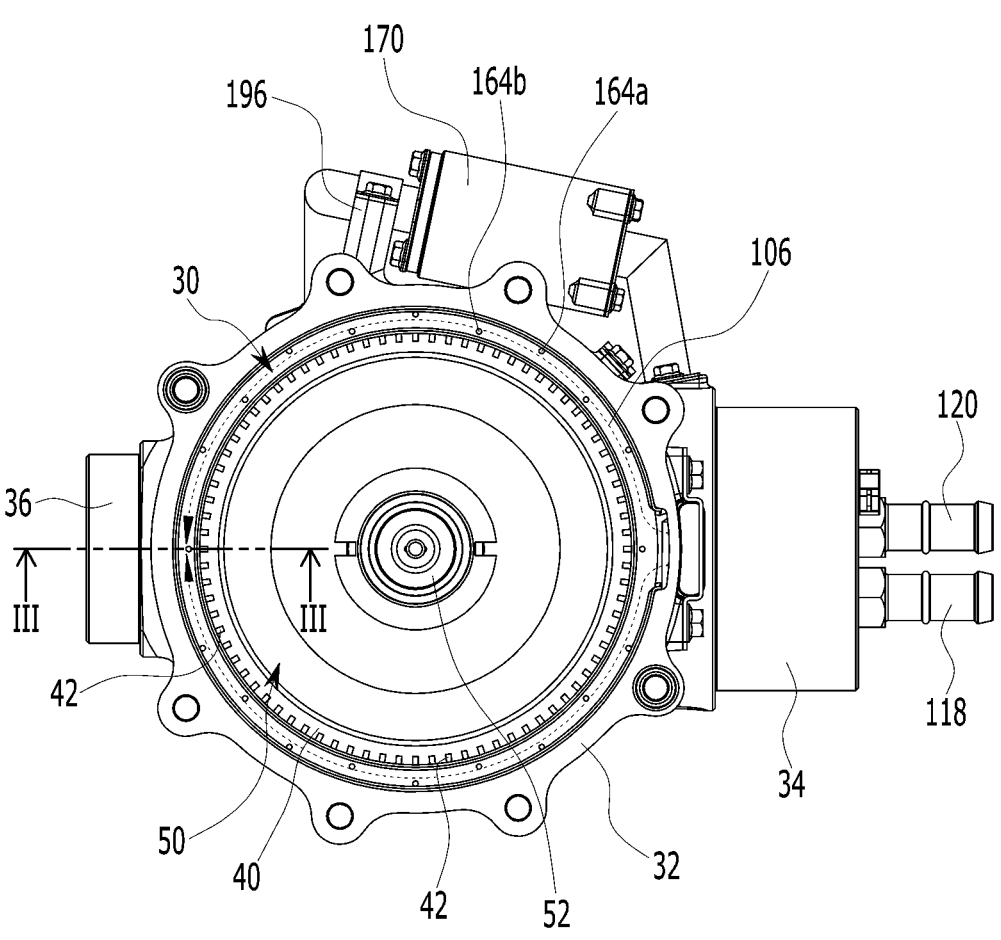
FIG. 10 is a top plan view of the drive motor from which a rear cover is excluded.
Figure 11:
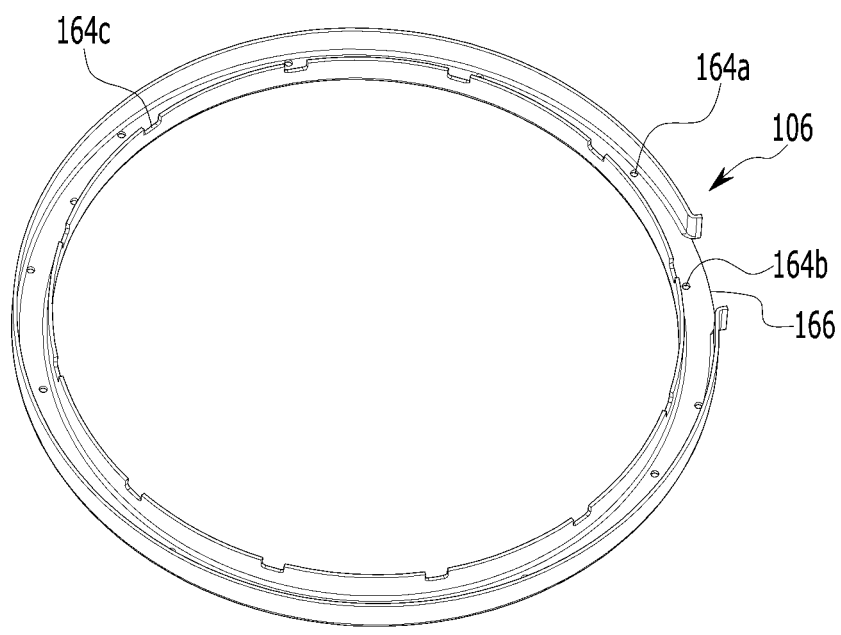
FIG. 11 is a perspective view of an oil gallery.
Figure 12:
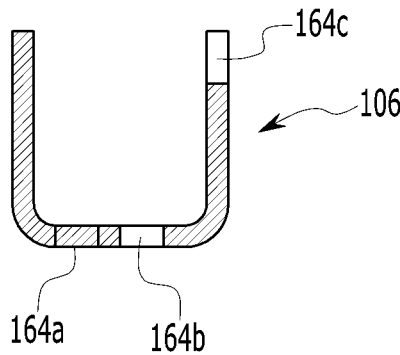
FIG. 12 is a cross-sectional view taken along line III-III and illustrating the oil gallery in FIG. 10.
Figure 13:
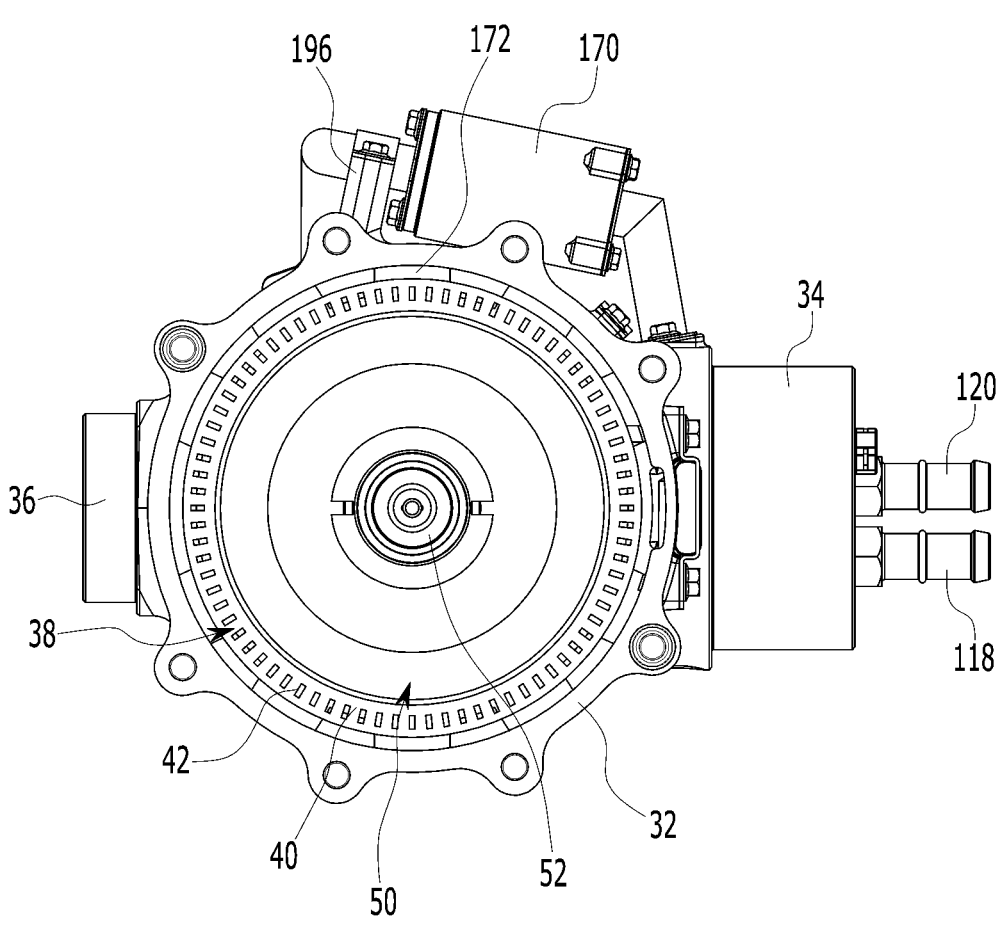
FIG. 13 is a top plan view of the drive motor in FIG. 10 from which the oil gallery is excluded.
Figure 14:
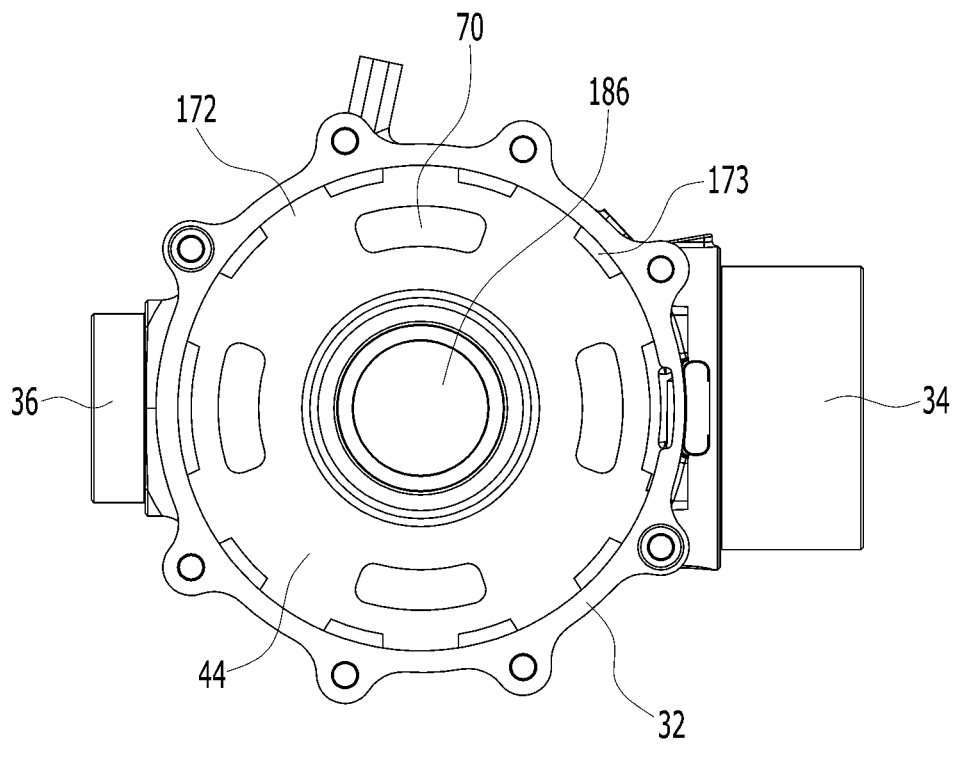
FIG. 14 is a top plan view of a motor housing from which the rear cover is excluded.
Figure 15:
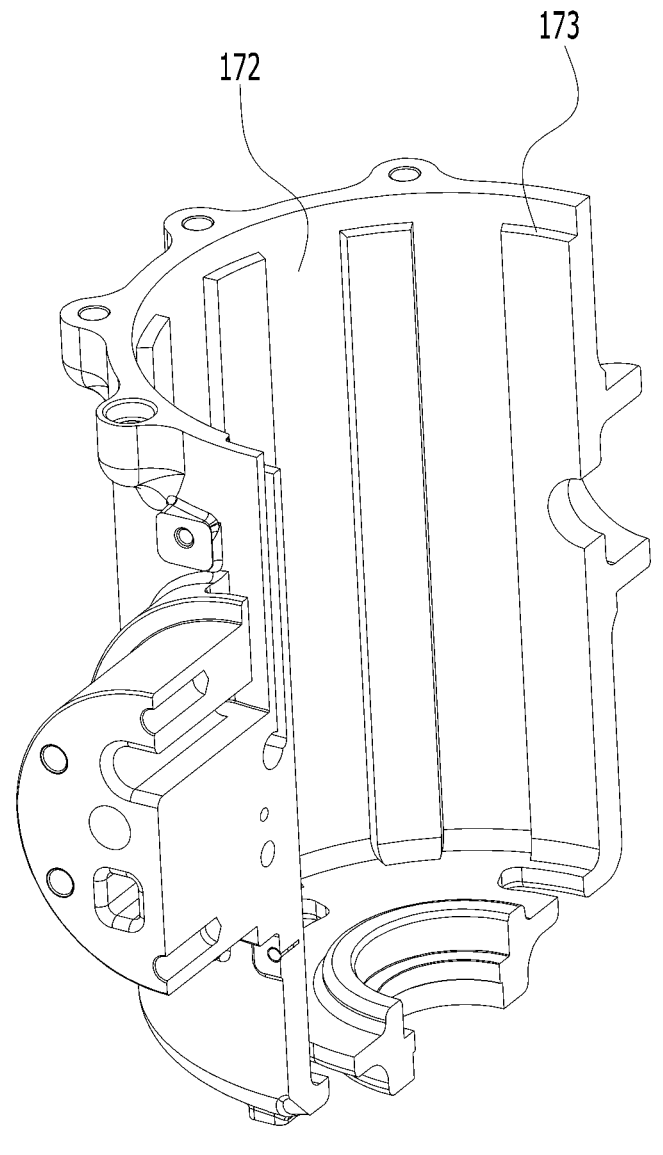
FIG. 15 is a perspective view of the motor housing that is partially cut away.

As illustrated in FIGS. 10 to 12, the oil gallery 106 is formed in an annular shape and has a 'U'-shaped cross-section opened at an upper side thereof. An upper opening portion of the oil gallery 106 is covered by the rear cover 72. A communication hole 166 is formed at a preset position on the oil gallery 106 and communicates with the oil supply hole 108. Therefore, the oil, which is supplied to the upper end of the motor housing 32 through the oil supply hole 108, is supplied to the oil gallery 106 through the communication hole 166. The oil flows circularly along the oil gallery 106 and fills the oil gallery 106.

At least one first gallery hole 164a and at least one second gallery hole 164b are formed in the circumferential direction in a lower surface of the oil gallery 106. The first gallery hole 164a may be disposed radially outward of the second gallery hole 164b. The first gallery holes 164a and the second gallery holes 164b may be alternately disposed. That is, the second gallery hole 164b is disposed between the two adjacent first gallery holes 164a, and the first gallery hole 164a is disposed between the two adjacent second gallery holes 164b. In addition, at least one third gallery hole 164c may also be formed in a lateral surface of an inner-diameter portion of the oil gallery 106.

The oil supplied to the oil gallery 106 is supplied into the drive motor 30 through the first, second, and third gallery holes 164a, 164b, and 164c. More specifically, the first gallery hole 164a disposed relatively radially outward is formed to correspond to the slot 172 formed in the lateral surface of the motor housing 32, such that the oil having passed through the first gallery hole 164a may flow downward in the motor housing 32 through the slot 172. On the contrary, the second gallery hole 164b disposed relatively radially inward is formed to correspond to the stator core cooling hole 42, such that the oil having passed through the second gallery hole 164b may flow downward through the stator core cooling hole 42. The oil having passed through the third gallery hole 164c may flow downward through the stator core cooling hole 42 and/or a gap between the stator 38 and the rotor 50. In other words, the oil cools the stator 38 and/or the rotor 50 while flowing through the three types of cooling passageways (i.e., the slot 172, the stator core cooling hole 42, and the gap between the stator 38 and the rotor 50).

With reference back to FIGS. 2, 4, and 14, the oil, which flows to a lower portion in the motor housing 32 through the slot 172, the stator core cooling hole 42, and the gap between the stator 38 and the rotor 50, is discharged to the outside of the motor housing 32 through the front discharge hole 70 formed in the front surface 44 of the motor housing 32 and temporarily stored on a lower portion in the drum 10.

As illustrated in FIGS. 16 to 18, an oil filter holder 196 and a suction tube holder 197 are further provided on an outer surface of the motor housing 32. An oil filter 170 is mounted in the motor housing 32 by means of the oil filter holder 196, and a suction tube 126 is mounted in the motor housing 32 by means of the suction tube holder 197.

A free end of the suction tube 126 is positioned to be lower than an oil level OL in the drum 10 and configured to suck the oil in the drum 10. The suction tube 126 is connected to the oil filter 170 and filters out foreign substances in the sucked oil. In addition, the suction tube 126 is connected to the suction motor 130 through the discharge passageway 120. Therefore, when the suction motor 130 operates, the oil in the drum 10 is sucked through the suction tube 126. After foreign substances in the oil are filtered out while the oil passes through the oil filter 170, the oil is discharged to the outside of the power transmission device 1 through the discharge passageway 120. The oil is cooled while passing through the external cooling system and then supplied back into the power transmission device 1 through the supply passageway 118. Meanwhile, a magnet may be attached to the suction tube 126 to catch iron particles in the oil.

Meanwhile, the oil, which is temporarily stored on the lower portion in the drum 10, is churned by the rotating drum 10, particularly the driven gear 64 and flows to the upper portion of the drum 10 while rotating together with the drum 10. A flow of the oil, which has flowed to the upper portion of the drum 10, is blocked by the oil wall 182 provided on the upper surface of the resolver cover 82, and the flow of the oil is guided to the through-hole 54 and the resolver oil groove 194.

The oil guided to the through-hole 54 cools the rotor 50 or the like while flowing downward along the through-hole 54. Thereafter, a part of the oil flows to the outside of the motor shaft 52 through at least one branch hole 92, lubricates and cools the bearing 124, and then is discharged to the lower portion of the drum 10. The remaining part of the oil flows to the lower end of the motor shaft 52 along the through-hole 54 and then is discharged to the lower portion of the drum 10.

A part of the oil guided to the resolver oil groove 194 is supplied to the bearing 76 through the rear cover oil hole 184, lubricates and cools the bearing 76, and then is introduced into the motor housing 32. The oil cools the stator 38 and the rotor 50 while passing through the gap between the stator 38 and the rotor 50 and flows to the lower portion in the motor housing 32. Thereafter, the oil is discharged to the lower portion of the drum 10 through the front discharge hole 70 of the front surface 44 of the motor housing 32.

The remaining part of the oil guided to the resolver oil groove 194 is introduced into the motor housing 32 through the rear supply hole 74 of the rear cover 72. The oil cools the stator 38 and the rotor 50 while passing through the gap between the stator 38 and the rotor 50 and/or the stator core cooling hole 42 and flows to the lower portion in the motor housing 32. Thereafter, the oil is discharged to the lower portion of the drum 10 through the front discharge hole 70 of the front surface 44 of the motor housing 32.

The oil, which is temporarily stored on the lower portion in the drum 10, is introduced between the wheel hub 20 and the drum 10 through the air inlet port 6 of the wheel hub 20 while rotating together with the drum 10, and the oil may be cooled by the air passing through the air passageways 150.

Meanwhile, as illustrated in FIG. 16, the motor arm 34 may be equipped with an air breather 180. The air breather 180 is connected to the inside of the motor housing 32 through a passageway (not illustrated) in the motor arm 34 and discharges the air, which is expanded by an increase in temperature of the oil in the drum 10, to the outside of the power transmission device 1. Meanwhile, the oil in the motor housing 32 is designed not to be discharged to the outside of the motor housing 32 through the air breather 180.

While the exemplary embodiments of the present disclosure have been described, the present disclosure is not limited to the embodiments. The present disclosure covers all modifications that can be easily made from the embodiments of the present disclosure by those skilled in the art and considered as being equivalent to the present disclosure.

The invention claimed is:

1. A power transmission device comprising:
a drive motor including a motor housing having a front surface, a rear cover coupled to a rear surface of the motor housing, a stator fixed in the motor housing and configured to generate a magnetic field, a rotor disposed radially inside the stator with a preset gap from the stator and configured to be rotated by the magnetic field generated by the stator, a motor shaft coupled to the rotor to rotate together with the rotor, the motor shaft extending in a longitudinal direction and penetrating the front surface and the rear cover, and a driving gear provided at one end of the motor shaft penetrating the front surface and protruding to an outside of the motor housing;
a drum configured to surround the drive motor and including a drum circular plate portion provided on one surface in a wheel axis direction, and a cylindrical portion extending in the wheel axis direction from an outer diameter end of the drum circular plate portion;

a drum cover coupled to an other surface of the drum based in the wheel axis direction and having an outer-diameter portion on which a driven gear engaging with the driving gear is provided; and a wheel hub on which a tire is mounted, the wheel hub being coupled to the drum to rotate together with the drum, wherein the drive motor is disposed to be directed downward so that a front surface of the drive motor is closer to a ground surface than a rear surface of the drive motor, and the drive motor further comprises a motor arm extending from the motor housing to an other side in the wheel axis direction, wherein the motor arm has a supply passageway for supplying oil into the drive motor, and a discharge passageway for discharging the oil in the drum to an outside, and wherein an oil gallery is disposed at an upper end portion of the motor housing, and an oil supply hole is formed in the motor housing and communicates the supply passageway and the oil gallery such that the oil supplied through the supply passageway is supplied to the drive motor through the oil gallery.

2. The power transmission device of claim 1, wherein:

the oil gallery has at least one first gallery hole and at least one second gallery hole, the at least one first gallery hole is disposed radially outward of the at least one second gallery hole, and the at least one first and at least one second gallery holes are alternately disposed to each other.

3. The power transmission device of claim 2, wherein:

a slot is formed in an inner surface of the motor housing to allow the oil, which has passed through the at least one first gallery hole, to flow to the front surface of the motor housing, and a stator core cooling hole is formed in the stator to allow the oil, which has passed through the at least one second gallery hole, to flow to the front surface of the motor housing.

4. The power transmission device of claim 1, wherein:

at least one third gallery hole is further formed in the oil gallery.

5. The power transmission device of claim 1, wherein a front discharge hole is formed in the front surface to discharge the oil in the motor housing to the drum outside the motor housing.

6. The power transmission device of claim 1, wherein:

a resolver rotor is formed at an other end portion of the motor shaft, which penetrates the rear cover and protrudes to the outside of the motor housing, and changes physical values corresponding to a rotational speed of the motor shaft, and a resolver stator is mounted on an upper surface of the rear cover and detects the change in the physical values generated by the resolver rotor, and a resolver cover is mounted on the upper surface of the rear cover, mounted between the rear cover and the motor shaft, and configured to fluidly seal and protect the resolver rotor and the resolver stator.

7. The power transmission device of claim 6, wherein:

the motor shaft has a through-hole formed in the longitudinal direction, a resolver cover oil groove is formed in a lateral surface of the resolver cover in the longitudinal direction, and an oil wall protrudes from an upper surface of the resolver cover and guides the oil, which is in the drum and churned by the driven gear, to the resolver cover oil groove and the through-hole.

8. The power transmission device of claim 7, wherein:

at least one branch hole is formed in the motor shaft and extends to an outer peripheral surface of the motor shaft from the through-hole.

9. The power transmission device of claim 7, wherein:

a rear supply hole and a rear cover oil hole are formed in the rear cover and guide the oil, which is guided to the resolver cover oil groove, into the motor housing.

10. The power transmission device of claim 1, further comprising:

a suction motor configured to discharge the oil in the drum to the outside through the discharge passageway.

11. The power transmission device of claim 10, further comprising:

a suction tube having a free end positioned to be lower than an oil level in the drum and connected to the suction motor through the discharge passageway.

12. The power transmission device of claim 11, further comprising:

an oil filter connected to the suction tube and configured to filter out foreign substances in the oil sucked through the suction tube.

* * * * *